No. 745,744. PATENTED DEC. 1, 1903.
A. UHALT.
COFFEE POT INDICATOR.
APPLICATION FILED AUG. 24, 1903.
NO MODEL.
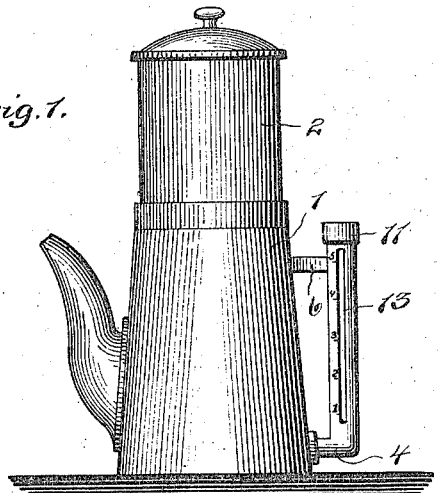
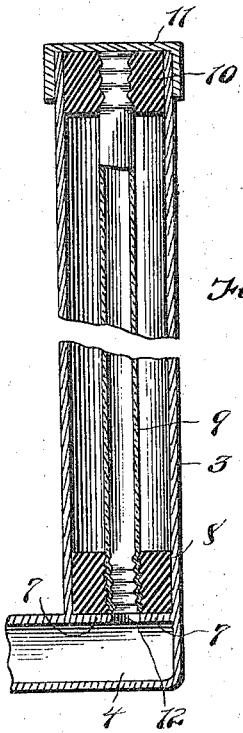
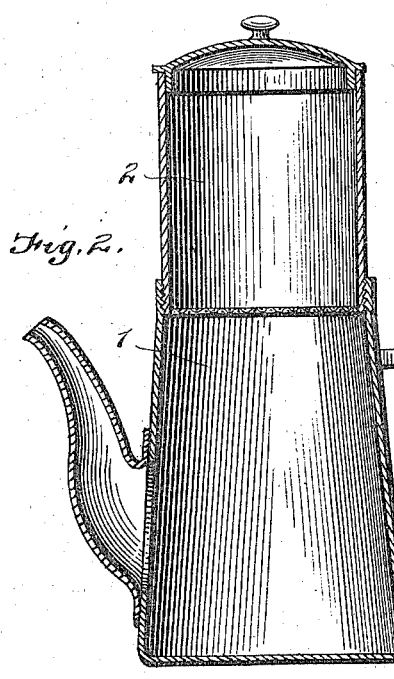
Witnesses
R. A. Boswell
Stephen A. Brooks
Inventor
Alfred Uhalt,
By
Attorneys.

No. 745,744.

Patented December 1, 1903.

UNITED STATES PATENT OFFICE.

ALFRED UHALT, OF NEW ORLEANS, LOUISIANA.

COFFEE-POT INDICATOR.

SPECIFICATION forming part of Letters Patent No. 745,744, dated December 1, 1903.

Application filed August 24, 1903. Serial No. 170,551. (No model.)

*To all whom it may concern:*

Be it known that I, ALFRED UHALT, a citizen of the United States, residing at New Orleans, in the parish of Orleans and State of Louisiana, have invented new and useful Improvements in Coffee-Pot Indicators, of which the following is a specification.

My invention relates to certain new and useful improvements in coffee-pot indicators, wherein the exact amount of coffee within the pot can be told at a glance without any measuring prior to the filling of the pot or removing of the cover or lid thereof.

The primary object of the invention is to so construct the indicator that it will serve the double function of an indicating means and, further, a handle.

Further objects and advantages will be set forth in the following description and claims.

In the accompanying drawings, in which like numerals of reference indicate like parts throughout the several views, Figure 1 is a view in side elevation of a coffee-pot constructed in accordance with the present invention, the same being provided with a coffee-drip receptacle. Fig. 2 is a vertical cross-sectional view thereof; and Fig. 3 is a detail view, in vertical cross-section, of the combined handle and indicator.

1 indicates the coffee-pot, and 2 the receptacle in which the coffee is placed in order to make what is commonly known in the art as "drip coffee."

3 indicates the handle, which has its lower end bent inwardly, as at 4, and communicating with the interior of the coffee-pot through the opening 5 thereof. This handle has its inbent lower end soldered or otherwise secured to the pot. This, however, does not enter into the present invention, and a further detail discussion is therefore unnecessary. The upper portion of the handle is supported by a brace 6. As illustrated in Figs. 2 and 3 of the drawings, the vertically-disposed portion of the handle is provided at its lower end with a horizontal partition 7, on which rests the flexible washer, which is provided with a screw-threaded opening receiving the externally-screw-threaded end of the transparent tube 9. The upper end of this tube is similarly constructed and is arranged within the washer 10.

11 indicates a cap which is frictionally held on the upper end of the handle and which while serving its capacity in this respect further forms a closing medium for the upper end of the said tube 9.

In operation after the coffee has been placed in the receptacle 2 and the water poured onto the same the latter percolating through the foraminous bottom of the receptacle will pass into the coffee-pot, then through the inbent lower end of the handle and up through the opening 12 of the partition 7 into the tube 9, where it will be readily seen through the elongated slot or sight-opening 13 of the handle.

In the accompanying drawings I have shown the handle adjacent the slot 13 thereof as being graduated in order to indicate the exact number of cupfuls of liquid contained within the coffee-pot.

While I have shown my improvement attached to a coffee-pot of the well-known type, yet it will be obvious that I do not restrict myself to such use, inasmuch as the same can be readily used in connection with any vessel wherein it is desired to keep track of the exact quantities contained therein. It will further be noted that the specific means for securing the two receptacles 1 and 2 together is not absolutely essential, inasmuch as their mechanical equivalent will suffice.

Having thus fully described my invention, I claim as new and desire to secure by Letters Patent—

1. A device of the type set forth comprising a receptacle, a handle having its lower end bent inwardly and communicating therewith, and means arranged in said handle and communicating with the lower end thereof for indicating purposes.

2. In combination with a receptacle, a handle communicating therewith, a transparent tube arranged in said handle into which the liquid from said receptacle is adapted to pass, and means for securing said tube in the handle.

3. In a device of the type set forth, a handle having its lower portion bent inwardly, a transparent tube arranged in said handle, said handle being formed with an opening alining with said tube, in combination with a receptacle with which the said handle communicates, substantially as described.

4. In a device of the type set forth, a receptacle, a handle having its lower end bent inwardly and in communication with said receptacle, a partition arranged in said handle above the bent portion thereof and being formed with an opening, a transparent tube resting on said partition and being in alinement with the opening thereof, means for securing said tube in position, and a cap removably arranged on the upper end of said handle.

5. In combination with the receptacle, and the handle thereof communicating therewith, a partition arranged in said handle and being formed with an opening, a washer arranged on said partition and being formed with a threaded opening alining with the opening thereof, a transparent tube having its lower end externally threaded and arranged in the opening of said washer, means for supporting the upper end of said tube, and means for closing the upper end of said tube and handle.

In testimony whereof I have signed my name to this specification in the presence of two subscribing witnesses.

ALFRED UHALT.

Witnesses:
  W. McL. FAYSSAUX,
  J. F. BATH.